United States Patent [19]

Blue et al.

[11] Patent Number: 4,998,571
[45] Date of Patent: Mar. 12, 1991

[54] OVERFILL VALVE APPARATUS

[76] Inventors: Barry M. Blue; James P. Blue, both of P.O. Box 267, Hannibal, Mo. 63410

[21] Appl. No.: 458,902

[22] Filed: Dec. 29, 1989

[51] Int. Cl.⁵ ............................................. F16K 31/18
[52] U.S. Cl. .................................... 141/198; 141/213; 141/215; 141/220; 137/416; 137/434; 137/410; 137/448
[58] Field of Search ................ 141/192, 198, 199–206, 141/211–216, 220–225, 229, 303; 137/513.3, 513.5, 416, 448, 434, 410, 421, 527, 315

[56] References Cited

U.S. PATENT DOCUMENTS

| | | | |
|---|---|---|---|
| 2,340,936 | 2/1944 | Cook | 220/86 R |
| 2,569,110 | 9/1951 | McGillis et al. | 137/448 X |
| 3,078,867 | 2/1963 | McGillis et al. | 137/448 X |
| 3,963,041 | 6/1976 | McGillis et al. | 141/198 X |
| 4,667,711 | 5/1987 | Draft | 141/198 |

FOREIGN PATENT DOCUMENTS

| | | | |
|---|---|---|---|
| 1360869 | 4/1964 | France | 141/198 |
| 2239636 | 2/1975 | France | 137/448 |
| 2355736 | 1/1978 | France | 141/198 |
| 2331732 | 10/1982 | France | 141/198 |
| 1444260 | 7/1976 | United Kingdom | 137/448 |
| 1531083 | 11/1978 | United Kingdom | 141/198 |

Primary Examiner—Ernest G. Cusick
Attorney, Agent, or Firm—Polster, Polster and Lucchesi

[57] ABSTRACT

An overfill valve apparatus for use in a liquid storage container having a fill pipe includes an upper fill tube and a lower drop tube. A closure valve is positioned intermediate the fill tube and the drop tube. The valve includes a valve head moveable between a first open position and a second closed position. A float is attached to the valve head and is moveable from a first position when the container liquid level is less than a predetermined level and a second position when the container fills with fluid to a predetermined level. Movement of the float towards its second position produces movement of the valve head toward its closed position. The float also is moveable within an envelope corresponding to a diameter less than the diameter of the fill pipe to facilitate apparatus installation and removal. The valve head is mounted internally of a hollow shell. The shell includes in at least a portion which is inwardly flexible to form a pocket accommodating the float during apparatus installation and removal, and outwardly flexible during fluid flow so as to conform to a side wall of the shell to present a uniform, non-flow restrictive shell diameter during such flow.

20 Claims, 4 Drawing Sheets

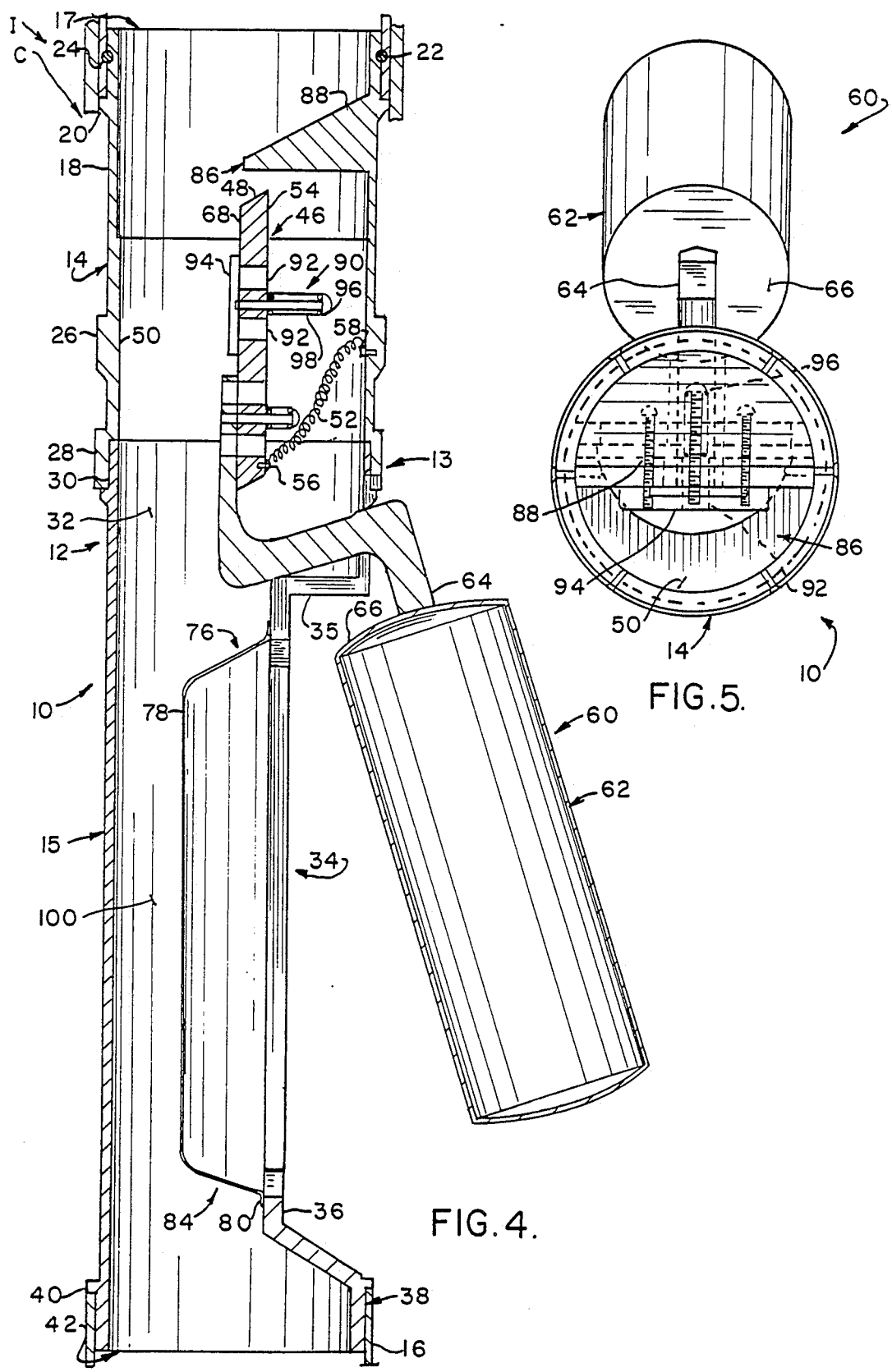

OVERFILL VALVE APPARATUS

BACKGROUND OF THE INVENTION

This invention relates to overfill valves for storage containers and in particular, to devices capable of retrofitting such containers insitu. While the invention is described with particular reference to its use in storage containers in filling stations or gasoline station environments, those skilled in the art will recognize the wider applicability of the inventive principals disclosed hereinafter.

Liquid storage containers such as in-ground tanks are often used to store highly toxic or flammable fluids and chemicals. The gasoline storage tanks used at filling or service stations to hold the various gasolines and diesel fuels sold to customers are a common example of the type of tank or container with which the present invention finds application. Access to such in-ground tanks for purposes of measuring the fluid contained therein, and for adding such fluid commonly is through a fill pipe. The fill pipe normally is closed or sealed at ground level by a cover that is removed for filling operations. At such times, a hose is inserted into the fill pipe and the fluid is pumped into the container through the hose.

A recurring problem with storage tanks is spillage of fluid. Spillage often occurs as a result of tank overflow and creates a potentially hazardous situation given the volatile and dangerous nature of gasoline, for example. Notwithstanding the potentially hazardous situation, evaporation of gasoline in the atmosphere is an environmentally undesirable situation. Various governmental regulations have been imposed requiring owners of the containers and the people who service or fill them to take precautions against spillage. As a consequence, several approaches have been developed in the prior art to prevent such spillage. Monitoring systems, for example, are available which automatically sense the level of fluid in the tank and shut the filling or pumping system down when the monitoring system senses that the tank is at or near full capacity.

A second approach has been to use overfill valves which can be retrofitted to the storage container. Overfill valves have the advantage of being cheaper than available monitoring systems. However, the valves must meet certain requirements if they are to find wide application. Commonly, the storage level of gasoline tanks is determined from dip sticks which are manually placed into the tanks and read. Consequently, overflow valves must be sufficiently non-restrictive to permit insertion and removal of the manual measuring instrument. The valves also must be relatively easy to be placed in operation, must not contaminate the fluid being stored and must be capable of easy removal if the valve malfunctions in operational use.

A number of prior art devices have been developed in an attempt to meet these requirements. These include the constructions shown in United States Patent to Draft, No. U.S. Pat. No. 4,667,711, the United States Patent to McGillis, No. U.S. Pat. No. 3,963,041, and the United States Patent to McGillis et al, No. U.S. Pat. No. 3,078,867, as well as the French Patent to Robyn, No. U.S. Pat. No. 1,360,869. While the prior art constructions described in the above referenced patents work to perform their intended functions, they are not without drawbacks. For example, additional openings sometimes must be made in the tank in order to install the device. The valve assemblies themselves often are complicated and malfunction in applicational use. The installation of valve assemblies into pre-existing fill pipes requires that the assembly conform to an envelope which is less than the diameter of the fill pipe in which the assembly is placed. While certain constructions of the prior art do provide for such insertion, their designs are such that installation is not readily accomplished. In some designs, it is necessary to have an opening in the side of the valve. A float mechanism for operating the valve head fits in this opening and nests within the opening when so positioned. Openings in the pipe are not acceptable in gasoline storage facilities. In gasoline storage tanks, discharge of liquids into the tank must occur at or near the bottom of the storage tank. Openings in the valve to permit its installation do not satisfy this discharge requirement.

We are aware of other designs which close such opening by various means. Sometimes complicated closure structures are provided. In other designs, the shell is formed to correspond to a specially designed float construction. In these constructions, the float is designed to conform to the required envelope for insertion without using an opening in the valve. Special float designs are expensive and the materials from which the floats themselves are constructed often contaminate the fluids being stored in the tank. In addition, some assemblies use complex valve designs or designs so the valve head can be placed at only one location within the valve structure. The complexity of the construction requires specially designed valve seats which adds to the cost of the assembly, while attaching the valve head at a single position in the assembly limits the design flexibility and may require a precise seating arrangement to ensure proper closure of the valve.

It is an object of the present invention to provide an overflow valve apparatus which is useful in containers such as in-ground storage tanks that hold dangerous, toxic or flammable liquids to facilitate filling the tank while, at the same time, preventing overfilling of the tank and the potentially hazardous spills resulting therefrom.

Another object of this invention is to provide such an apparatus having a float mechanism external to a fill tube of the assembly but which readily conforms to an envelope defined by the diameter of the fill tube so that the apparatus can be readily installed and removed in a fill pipe of an associated storage tank.

Another object of this invention is to provide valve apparatus in which a float mechanism may be accommodated in the envelope of the fill tube during installation and removal, the float mechanism being positioned externally of the fill tube at all times.

Yet another object of this invention is to provide an overflow valve apparatus which is low in cost, simple in design, and which does not require a special seating structure therein to close off fluid flow through it.

A further object of this invention is to provide an overflow valve apparatus in which fluid flow through the valve is directed away from the valve head so as to not inadvertently close the valve head prior to the container being substantially full but which aids the seating of the valve head as the container becomes substantially full.

A still further object of this invention is to provide such an apparatus having a drain mechanism by which fluid in the fill tube when the valve closes can readily drain into the container.

Another object of this invention is to provide such an apparatus constructed from materials which do not contaminate the fluid with which the container is filled.

Yet another object of this invention is to provide a simplified spring arrangement for biasing a float mechanism to an operative position.

Still another object of this invention is to provide an overfill valve apparatus which is installable insitu without alteration to an in-place container.

Other objects of this invention will be apparent to those skilled in the art in light of the following description and accompanying drawings.

SUMMARY OF THE INVENTION

In accordance with this invention, generally stated, an overflow valve apparatus for use in liquid storage containers is provided in which an upper fill tube and a lower drop tube are interconnected to a simple valve structure for monitoring a fluid condition in the container. The container includes a fill pipe having an inlet and the upper fill tube of the apparatus has a flanged mouth. The valve structure includes a valve housing or shell. A valve head is positioned in the housing intermediate the ends thereof and is moveable from a first opened positioned to a second closed position. A float is attached to the valve head and is moveable from a first position when the container liquid level is less than a predetermined level to a second position as the container fills with fluid to a predetermined level. Movement of the float toward its second position produces movement of the valve head toward its second position. The valve housing includes a flexible portion for accommodating the float, which permits the float to move within an envelope corresponding to an envelope which is less than the diameter than the fill pipe to permit apparatus installation into and removable from the container. The flexible portion of the housing also is outwardly flexible during fluid flow through the pipe to conform to a side wall of the housing to present a substantially uniform, non-flow restricting path for such flow. The float is biased to at least one operative position by a simplified mechanism.

BRIEF DESCRIPTION OF THE DRAWINGS

FIG. 4 is a sectional view corresponding to FIG. 2 illustrating the apparatus after installation in the container of FIG. 1;

FIG. 5 is a top plan view of the apparatus shown in its FIG. 4 position;

Corresponding reference characters indicate corresponding parts throughout the several views of the drawings.

DESCRIPTION OF THE PREFERRED EMBODIMENT

Figure 1:
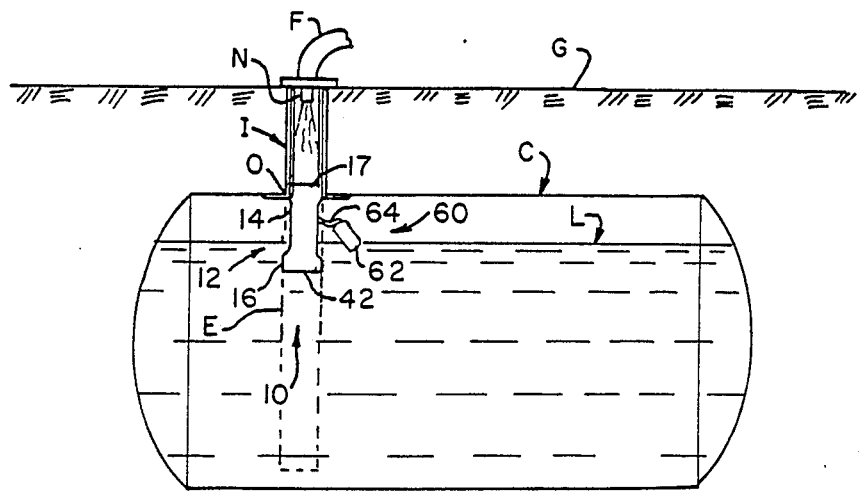
FIG. 1 is a representation, partly in section, and partly broken away, of an in-ground liquid storage container illustrating the use of the apparatus of the present invention.

Referring now to FIG. 1, reference numeral 10 indicates one illustrative embodiment of an overflow valve apparatus of the present invention. The apparatus 10 is used with a liquid storage container C, which, as shown in FIG. 1, is illustrated in the form of an in-ground storage tank of the type used in service stations for storing a liquid L such as gasoline, diesel fuel, or other similar material. The tank has an opening O in its upper surface, referenced to FIG. 1, and an inlet pipe or tube I extends from the ground level to the opening O in a conventional manner. A removable cover plate, not shown, closes the upper end of the pipe I. When the container C is to be filled, the cover plate is removed and a nozzle N of a fuel line F is inserted into the upper end of pipe I. An operator then discharges fluid, for example, gasoline, into the container C. In the past, if the operator was not careful, it was easy to overfill the container C, with the excess liquid spilling onto the ground G. Various environmental laws and regulations have been enacted which prohibit such spills, imposing penalties on the operator for such spills. As indicated, there are large number of in place container Cs which cannot easily meet these newly enacted requirements. It is a function of the apparatus 10 to stop the flow of liquid when the container C is full and to do so in a way that prevents spillage of liquid onto the ground G.

Apparatus 10, in the embodiment illustrated, includes an upper fill tube 12, a lower drop tube 16, and a valve 1, which together define an enclosure for the apparatus, the entire apparatus 10 being installable in the inlet pipe I of existing installations of the container C.

Figure 7:
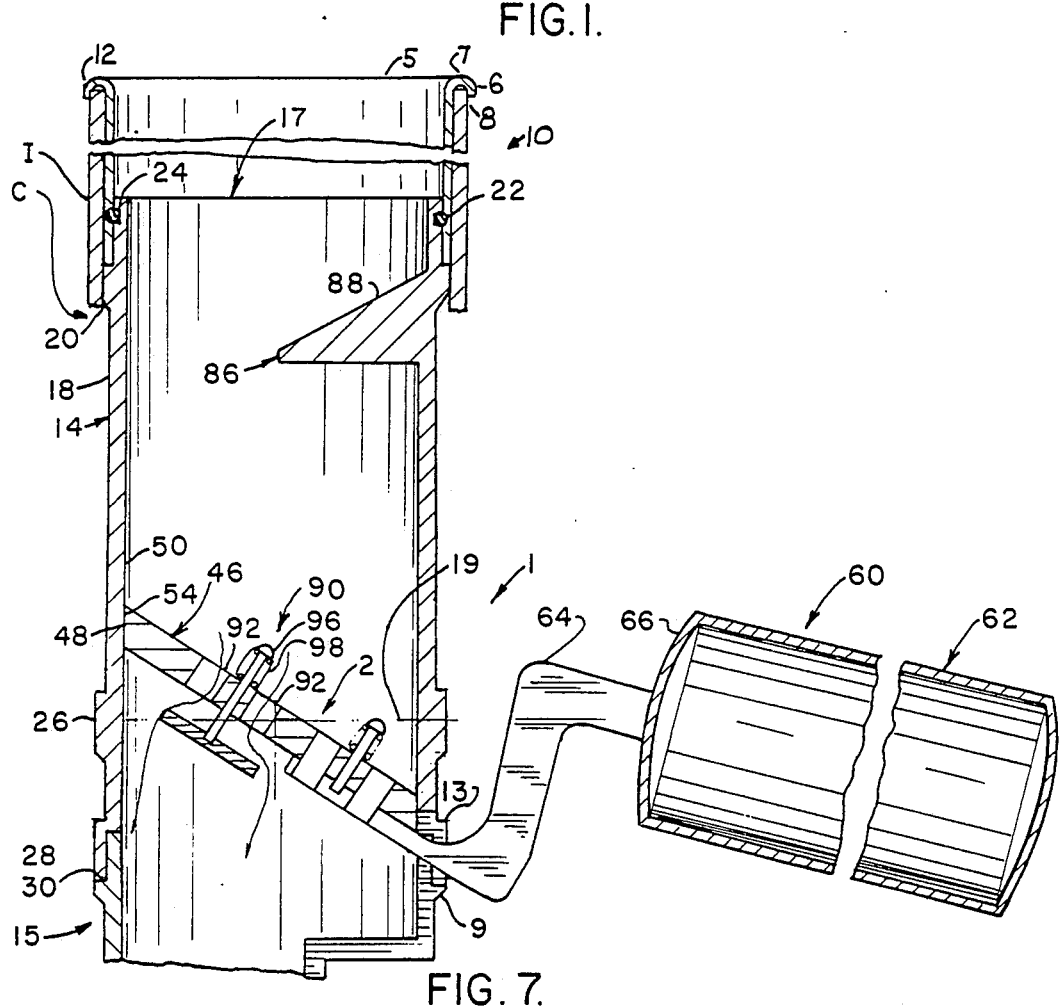

Fill tube 12 has an upper end 5, illustrated in FIG. 7, formed to define a turned lip 6. Lip 6 delimits an engagement portion 7 which receives an end 8 of inlet pipe I. The intermounting of the end 5 of fill tube 12 with the inlet pipe I supports the entire remaining portion of the apparatus 10 in applicational use.

Figures 2, 3:
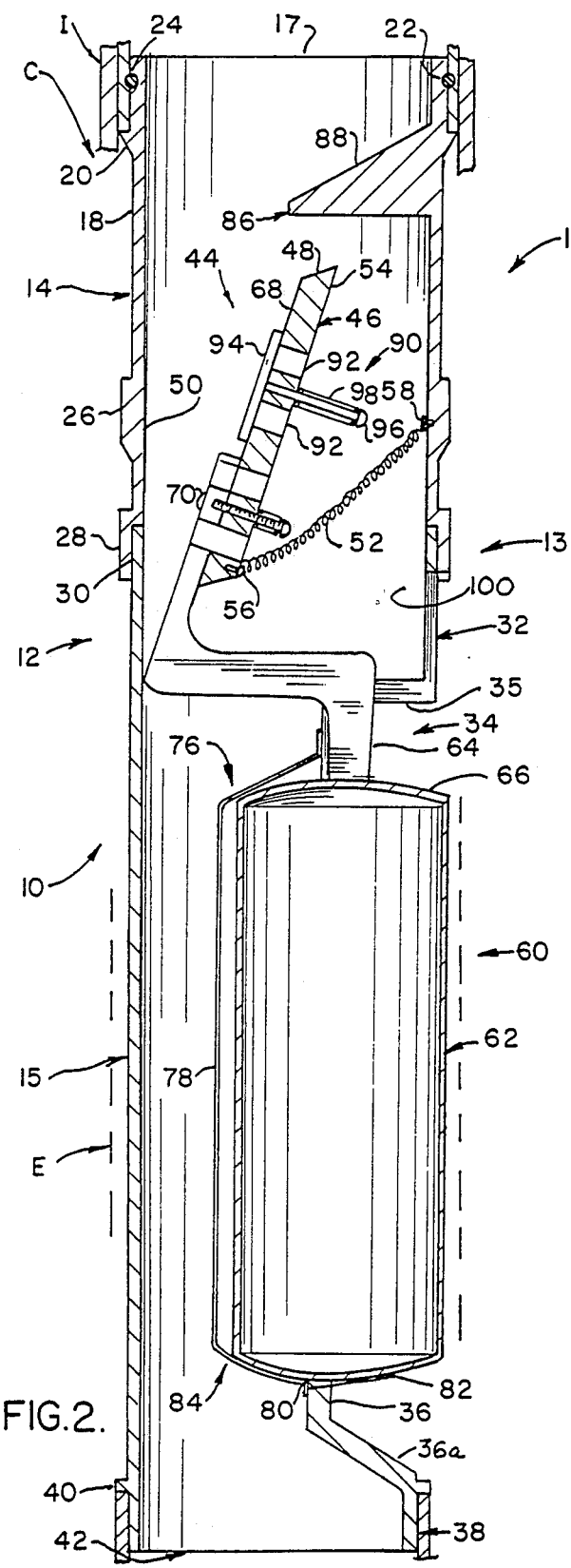
FIG. 2 is a sectional view, partly broken away, of the apparatus shown in FIG. 1, shown in its installation and removal position.
FIG. 3 is a view in side elevation of the apparatus shown in FIG. 2.

As shown in FIG. 2, the valve 1 is a two-piece construction and includes a hollow housing or shell 13 having an upper section 14 and a lower section 15 intermounted to one another as described below.

Section 14 of the valve 1 is shorter in length than section 15, although the relative sizes may vary in other embodiments of this invention. The section 14 has generally uniform inner diameter and an outer wall 18 separated by a material thickness. Wall 18 delimits a first circumferential shoulder 20 and an annular groove 22 intermediate the shoulder 20 and an end 17 of the section 14. An O-ring 24 is inserted in the groove 22 in a conventional manner. The fill tube 12 attached to the valve 1 and abutts the shoulder 20 in the completed construction of the apparatus 10. The O-ring 24 forms a fluid seal between the section 14 and the fill tube 12. Fill tube 12 may be mounted to the section 14 by any convenient method, conventional threaded fasteners work well, for example.

The wall 18 also has an enlarged diameter section 26 and an enlarged diameter collar 28 at the lower end of section 14. The section 26 delimits a strengthening member in the material thickness of the section 14, and defines a pivot plane 19 for a valve head 2, later described in greater detail.

Collar 28 intermates with an end 9 of lower section 15 so that the collar 28 mates with and abuts a circumferential shoulder 30 formed along the lower section 15. Again, the sections 14 and 15 may be joined together by any convenient method. Conventional threaded fasteners 31 work well, for example. The fasteners or screws 31 are inserted into the upper end of section 15 through and along the collar 28.

Lower section 15 includes an upper portion 32 having an inner diameter which corresponds to the inner diameter of the section 14. Section 15 has a reduced diameter portion 34 which is characterized at its upper end by an abrupt transition from a cylindrical cross section to one having a radially inwardly extending wall 35. At the inward end of the radially extending wall 35, the section 15 is partly delimited by a surface 36 which extends downwardly, referenced to the drawings, the length of the portion 34. A transition area 36a flares radially outwardly and downwardly until the diameter of the lower section 15 again corresponds to the diameter of upper portion 32. A lip 40 is formed along the lower end of the section 15. The lower drop tube 16 is mounted over the section 15, abuts the lip 40 and is attached to the section 15 at that point. Again, conventional threaded fasteners work well for the attachment.

The drop tube 16 is of generally uniform diameter, and is intended to discharge fluid entering the container C at or near the bottom of the container. That is to say, fluid entering the container C generally is inserted below the surface level of fluid already in the container C so as to be discharged within the container with as little turbulence as possible. As thus described, the apparatus 10 while constructed from various sized elements, has a dimentional diameter envelope E of generally uniform size, chosen so that diameter of envelope E is less than the diameter of the inlet pipe I.

A valve head 2 of the valve 1 is mounted along the pivot plane 19 and includes a valve head element 46. The element 46 has an angled side wall 48 which is chosen to enable the element 46 to seat against an inner wall 50 of section 14. When so seated, the element 46 blocks fluid flow through a mouth 44 of the valve 1, as later described in greater detail.

A flexible, spiral wound spring 52 is attached to an upper face 54 of the element 46 and to the internal wall 50 of the section 14 by any convenient method. Again, threaded fasteners or screws 56 work well for the interconnection. After the apparatus 10 is installed in the container C, the valve head element 46 of the valve 1 normally rests in a generally vertical position, similar to that shown in FIG. 4. The position shown in FIG. 4 is a first or open position of the valve 1. As the container C is filled, the valve head element 46 moves, as will be described hereinafter, to the position shown in FIG. 6, which is a second or closed position for the element 46. It will be noted that in the second position the element 46, the spring 52 is folded back over itself. While in the first or open position, the spring 52 is designed to be in tension so that it tends to draw the element 46 toward its closed position. This is an important feature of our invention in that the spring 52 operation permits the element 46 to function properly between normal operating positions without impeding the operation of the element 46 in any way. That is to say, for installation, the float means 60 is manipulated by hand to a first position shown in FIG. 2, within envelope E, and the devise 1 is inserted in the inlet I. The inlet I structure surrounding the envelope E maintains the float means 60 in position until it is below the outlet O of the container C. At that point, the spring 52 causes the element 46 and the attached float means 60 to proceed to the position shown in FIG. 4. Thereafter, the float means 60 functions in a normal method depending upon the level of the fluid in the container C.

A float means 60 includes a float 62 and a lever arm 64. Arm 64 is attached to the element 46 along a lower face 68 thereof by screws 70. Other interconnection techniques may be employed, if desired. The lever arm 64, which preferably is constructed from a solid, non-corrosive material such as brass, extends through a slot 72 formed in wall 18 of section 14 and a corresponding wall 100 of section 15. The dimensions of slot 72 are chosen so as to allow a full range of movement for the arm 64 of float means 60. Because float means 60 is attached to the element 46, movement of the float means 60 toward its second position produces movement of the element 46 toward its position preventing fluid flow through the valve 1.

Figure 6:
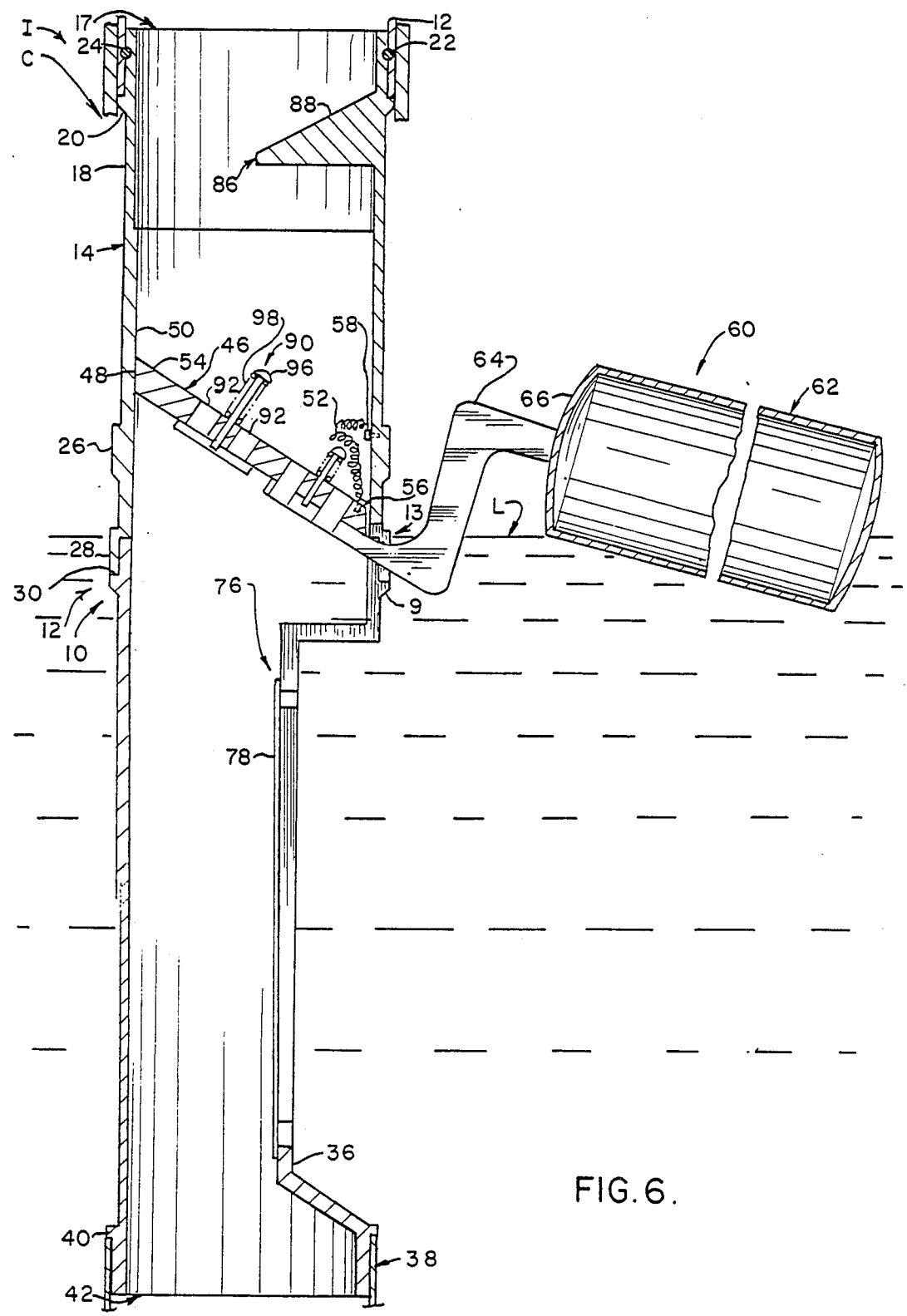
FIG. 6 is a sectional view of the apparatus when the container is filled to a level at which the float operates to close a valve head to prevent overfilling of the container and subsequent spillage; and, FIG. 7 is a partial sectional view, partly broken away, showing the apparatus in the FIG. 6 position, in which a drain valve is opened to drain liquid into the container.

FIG. 4 shows the normal position of the float 62 when the container C is empty or has little fluid in it. As shown in FIG. 4, the diameter of apparatus 10 in the installed position is substantially greater that the diameter inlet pipe I in which the apparatus 10 is installed. Installation or removal of the apparatus 10 in the inlet I requires that the apparatus 10 fit within the envelope E which has a dimension that is less than the diameter of inlet I. This requirement, in turn, means that the float 62 must be positionable within the envelope for insertion and removal of the apparatus 10. In order to accomplish movement of the float within the envelope E, we have provided a flexible closure 76 which is integral with the wall 100 of the section 15. Closure 76 includes a flexible material 78 which is moveable between at least first and second positions. A first position 84 is shown in FIGS. 2 and 4 while the second position is shown in FIG. 6. That is, the material 78 permits the closure 76 to conform to the silhouette of the wall 100 and surface 36 during fluid flow through the apparatus 10, so that the closure means 76 presents a substantially uniform, non-flow restrictive passage for such flow. Material 78, which is impervious to the chemical constituents of the fluid with which the container C is filled and which does not contaminate such fluid, is sized to receive the float 60 in the FIG. 2 position while being expandable to present uniform diameter to fluid flow. The material 78 is attached to the side wall 100 along an outer margin 80. Attachment of the material to the wall may be accomplished again, in any suitable manner. Threaded fasteners are acceptable means of attachment, for example. The use of the flexible closure portion of the apparatus 10 is an important feature of our invention, in that it permits the float 60 to positioned within the envelope E of the apparatus 10 for installation or removal, yet permits free fluid flow after installation of the apparatus 10. At no time is the float 60 actually positioned within the apparatus 10 since the apparatus 10 conforms to the float 60. Because of the ability to conform to the float 60, conventional float designs of non-corrosive material can be employed with the apparatus 10. Since conventional floats are employed, substantial cost savings can be effected in that special float designs to enable the float to conform to a pre-required envelope configuration, are not required.

A flow diverter 86 is integrally formed with inner wall 50 of section 14. The flow diverter 86 is positioned so that fluid striking the diverter is forced toward the open position of the element 46, shown in FIGS. 2 and 4. The diverter 86 includes a face 88 which slopes downwardly, reference to FIG. 4, and acts to deflect liquid toward the lower surface side 68 of element 46. This also is an important feature of our invention, in that it prevents the valve head element 46 from both being biased to a closed position by spring 52, and requires the float 62 to act positively before the valve head element 46 seats.

As fluid flows or cascades down the inner wall 100 of the section 15, it forces the material 78 outwardly, displacing the pocket and removing any restriction to flow in section 15. As the container is filled and float 62 reaches its FIG. 6 position, the valve head 2 seats, preventing further flow to the container C. The resulting back pressure of fluid flow is sensed in the nozzle N assembly, to terminate filling of fluid through line F. Filling termination results in container C being filled, but not being over-filled.

When the filling operation stops, there may be some fluid left in the inlet side of the valve head 2 above the now closed element 46. The apparatus 10 includes means 90 for draining this fluid into the container C. Element 46 has one or more holes 92 formed in it. At least one disc-shaped relief valve 94 is positioned on the lower surface 68 of the valve head element 46 and the diameter of disc-shaped relief valve 94 is such that it covers the face 68 end of the openings 92 in element 46 associated with it. Relief valve 94 is attached to one end of a spring-loaded shaft 96 which extends upwardly through the valve head element 46. A spring 98 seats against the upper face 54 of the valve head element 46 and urges the valve 94 upwardly against the pressure exerted on the relief valve by the column of liquid above the now closed valve head 2. If the pressure on the relief valve exceeds the spring force on the shaft, the relief valve is opened as shown in FIG. 7, to permit the fluid to drain into the container C. As will be noted, two relief valves are employed in the embodiment of the drawings.

Numerous variations, within the scope of the appended claims, will be apparent to those skilled in the art in light of the foregoing description and the accompanying drawings. Thus, while certain materials or connection techniques were described as preferred, other materials and connection techniques may be employed in other embodiments of this invention. The apparatus 10 as described above is a four element unit. Other embodiments of our invention my employ greater or fewer number of elements. While a feature of the invention is the fact a standard float design can be employed, the float design itself may be changed if desired. These variations are merely illustrative.

Having thus described the invention, what is claimed and desired to be secured by Letters Patent is:

1. An overflow valve apparatus for use in a liquid storage container having a fluid inlet, comprising:

an enclosure defining an envelope for insertion in said fluid inlet, said enclosure including a fill pipe;

valve means moveably mounted in the fill pipe, said valve means including a valve head moveable between at least a first open pipe position and a second, closed pipe position;

float means attached to the said valve head and movable from a first position when the container is empty to a second position as the container fills with liquid, movement of the float means toward its second position producing movement of the valve head toward its second position, the float means also being movable within the envelope defined by said enclosure, said envelope having a diameter which is less than the diameter of said fluid inlet to permit installation and removal of said valve apparatus; and, closure means defining at least a portion of the enclosure for said valve, said closure means being inwardly flexible to accommodate the float means during pipe installation and removal, and outwardly flexible during fluid flow to conform to a predetermined configuration of said enclosure so as to present a substantially uniform, non-flow restrictive path for such flow.

2. The apparatus of claim 1 further including spring means operatively connected between said enclosure and said valve head for biasing said float means to a first position.

3. The apparatus of claim 2 wherein the enclosure includes a side wall, and the valve head includes angled side walls which seat against the side wall of the enclosure as the float means moves to its second position, seating of the valve head constituting the second position of the valve.

4. The apparatus of claim 3 further including spring means, said spring means comprising a flexible, spiral wound spring foldable upon itself as the valve head moves toward the second position of the valve, one end of said spring being attached to the side wall of said enclosure and the other end of said spring being attached to the valve head.

5. The apparatus of claim 4 wherein the float means includes a float and an arm, said arm having a first end and a second end, one of said first and second ends being attached to the float and the other of said first and second ends being attached to the valve head.

6. The apparatus of claim 5 wherein said enclosure has an opening in its permitting said arm to extend therethrough.

7. The apparatus of claim 6 wherein the closure means comprises a flexible material, having an outer margin, the outer margin of the material being attached to said enclosure.

8. The apparatus of claim 7 wherein the side wall of said enclosure has an inner side and an outer side, and the material is attached to the inner side of the side wall.

9. The apparatus of claim 8 wherein said enclosure has a first diameter, said first diameter being less than the diameter of the fluid inlet for said container in which said apparatus finds application, said closure means being moveable to accommodate the float.

10. The apparatus of claim 9 wherein the material is outwardly flexible and responds to the flow of liquid therethrough to remove any flow restriction to the fluid.

11. The apparatus of claim 1 further including means for deflecting flow of liquid, said deflecting means being positioned above the valve means so at least a portion of the liquid flowing through said valve does not directly strike the valve head.

12. The apparatus of claim 11 further including means for draining liquid into the fluid container after said valve head closes.

13. The apparatus of claim 12 wherein said valve head element has at least one opening formed in it, said opening extending through the valve head, said means for draining being mounted in said opening.

14. The apparatus of claim 13 wherein the drain means includes a spring-loaded valve 15. The apparatus of claim 14 wherein the float is an elongated tubular float.

16. The apparatus of claim 1 further including a fill tube, said fill tube being operatively connected to said valve apparatus, said fill tube forming a portion of said enclosure, said fill tube having an upper end for mounting said valve apparatus to an inlet of said container.

17. The apparatus of claim 16 further including means for forming a seal between the fill tube and the fluid inlet.

18. An overflow valve apparatus for use in a liquid storage container having a fill pipe of a predetermined diameter, comprising:
   a fill tube having an end formed for attachment to an end of said fill pipe;
   valve means attached to said fill tube, said valve means including a valve head moveably mounted between at least first and second positions, a float attached to said valve head, and a shell containing said valve head, said shell including at least one flexible portion for accommodating the float during placement of said apparatus in said liquid storage container, and being outwardly flexible during fluid flow to conform to a predetermined configuration of said shell so as to present a substantially uniform, non-flow restrictive path for said flow.

19. The apparatus of claim 18 further including a drop tube mounted to said valve shell.

20. An overflow valve apparatus for use in a liquid storage container having a fill pipe of a pre-determined diameter comprising:
   a fill tube;
   valve means attached to said fill tube, said valve means including a valve head moveably mounted between at least a first position and second position;
   a float attached to and moveable with said valve head, and;
   a shell containing said valve head, said shell including at least one flexible portion moveable between a first position for accommodating the float during placement of said apparatus in said storage container, and a second outward position during fluid flow so as to present a substantially uniform, non-flow restrictive path for such flow along said flexible portion.

* * * * *